(12) United States Patent
Jung et al.

(10) Patent No.: US 12,069,359 B2
(45) Date of Patent: *Aug. 20, 2024

(54) REFLECTION MODULE INCLUDING A HOLDER AND A REFLECTIVE MEMBER AND A CAMERA MODULE INCLUDING A REFLECTION MODULE

(71) Applicant: Samsung Electro-Mechanics Co., Ltd., Suwon-si (KR)

(72) Inventors: Yeun Ho Jung, Suwon-si (KR); So Mi Yang, Suwon-si (KR); Jung Woo Kim, Suwon-si (KR); Jae Sun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,328

(22) Filed: May 17, 2022

(65) Prior Publication Data
US 2022/0279099 A1 Sep. 1, 2022

Related U.S. Application Data

(63) Continuation of application No. 17/113,594, filed on Dec. 7, 2020, now Pat. No. 11,363,176.

(30) Foreign Application Priority Data

Jan. 17, 2020 (KR) .......................... 10-2020-0006446
Sep. 2, 2020 (KR) .......................... 10-2020-0111833

(51) Int. Cl.
*H04N 5/335* (2011.01)
*H04N 23/51* (2023.01)
(Continued)

(52) U.S. Cl.
CPC ............ *H04N 23/55* (2023.01); *H04N 23/51* (2023.01); *H04N 23/57* (2023.01)

(58) Field of Classification Search
CPC ....................................................... H04N 23/55
See application file for complete search history.

(56) References Cited

U.S. PATENT DOCUMENTS 11,106,018 B2  8/2021  Goldenberg et al.
2007/0019165 A1  1/2007  Ishikura
(Continued)

FOREIGN PATENT DOCUMENTS

CN  109564337 A  4/2019
JP  2007-25331 A  2/2007
(Continued)

OTHER PUBLICATIONS

Korean Office Action issued on Jun. 30, 2021 in counterpart Korean Patent Application No. 10-2020-0111833 (9 pages in English and 6 pages in Korean).

(Continued)

*Primary Examiner* — Gary C Vieaux
(74) *Attorney, Agent, or Firm* — NSIP Law

(57) ABSTRACT

A reflection module includes: a holder; and a reflective member mounted on the holder and including an incident surface, a reflective surface, and an emitting surface. The holder includes a cover portion covering a portion of the emitting surface. An area of the cover portion covering the emitting surface increases in a direction toward a lower portion of the emitting surface.

19 Claims, 8 Drawing Sheets

(51) Int. Cl.
*H04N 23/55* (2023.01)
*H04N 23/57* (2023.01)

(56) References Cited

U.S. PATENT DOCUMENTS

| | | |
|---|---|---|
| 2007/0177867 A1 | 8/2007 | Yuge et al. |
| 2009/0153985 A1 | 6/2009 | Nagaoka et al. |
| 2011/0286114 A1 | 11/2011 | Nagaoka et al. |
| 2013/0033751 A1 | 2/2013 | Lai et al. |
| 2015/0253543 A1 | 9/2015 | Mercado |
| 2016/0223157 A1 | 8/2016 | Saito |
| 2016/0306180 A1 | 10/2016 | Rosa |
| 2018/0109660 A1 | 4/2018 | Yoon et al. |
| 2019/0049702 A1* | 2/2019 | Chou ................. G02B 13/0065 |
| 2019/0121103 A1 | 4/2019 | Bachar et al. |
| 2019/0361323 A1* | 11/2019 | Jerby .................... G03B 17/17 |
| 2020/0409020 A1 | 12/2020 | Yedid et al. |
| 2021/0048649 A1 | 2/2021 | Goldenberg et al. |
| 2021/0088877 A1* | 3/2021 | Mireault .................. G03B 5/00 |
| 2021/0132373 A1 | 5/2021 | Yang et al. |

FOREIGN PATENT DOCUMENTS

| | | | |
|---|---|---|---|
| JP | 2007-328190 A | 12/2007 | |
| JP | 2009-128712 A | 6/2009 | |
| JP | 2017-134306 A | 8/2017 | |
| KR | 10-2018-0003539 A | 1/2018 | |
| KR | 10-2019-0022522 A | 3/2019 | |
| WO | WO 2019/008517 A1 | 1/2019 | |
| WO | WO-2019008517 A1 * | 1/2019 | ......... G02B 13/0065 |

OTHER PUBLICATIONS

Chinese Office Action issued on Jan. 5, 2022, in counterpart Chinese Patent Application No. 202110048858.5 (5 pages in English and 7 pages in Chinese).

* cited by examiner

I-I'

REFLECTION MODULE INCLUDING A HOLDER AND A REFLECTIVE MEMBER AND A CAMERA MODULE INCLUDING A REFLECTION MODULE

CROSS-REFERENCE TO RELATED APPLICATIONS

This application is a Continuation application of U.S. patent application Ser. No. 17/113,594 filed on Dec. 7, 2020, now U.S. Pat. No. 11,363,176 issued on Jun. 14, 2022, which claims the benefit under 35 U.S.C. § 119(a) of Korean Patent Application Nos. 10-2020-0006446 filed on Jan. 17, 2020, and 10-2020-0111833 filed on Sep. 2, 2020, in the Korean Intellectual Property Office, the entire disclosures of which are incorporated herein by reference for all purposes.

BACKGROUND

1. Field

The following description relates to a reflection module and a camera module including a reflection module.

2. Description of Related Art

Camera modules are currently implemented in portable electronic devices including smartphones. A thickness of portable electronic devices is being decreased due to market demand, and accordingly, the miniaturization of camera modules is required.

In addition to demand for the miniaturization of camera modules, performance improvements of camera modules are also required. Accordingly, functions such as automatic focus adjustment, optical image stabilizing, and the like, are added to camera modules, so there is a limitation in reducing the size of such camera modules.

That is, a camera module may have a problem in that it is difficult to reduce the size of the camera module despite the demand for miniaturization and, accordingly, there is a limitation in reducing the thickness of a portable electronic device including the camera module. Recently, to solve such a problem, a camera module including a plurality of lenses disposed in a length direction or a width direction of a portable electronic device and a reflective member configured to change a path of light has been proposed. Since such a camera module has a structure different than that of conventional camera modules, such as having a longer total track length and having a reflective member, there is a problem in that image quality may deteriorate due to a flare phenomenon that may not occur in a conventional camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a reflection module includes: a holder; and a reflective member mounted on the holder and including an incident surface, a reflective surface, and an emitting surface. The holder includes a cover portion covering a portion of the emitting surface. An area of the cover portion covering the emitting surface increases in a direction toward a lower portion of the emitting surface.

The portion may include a first cover portion covering an edge of one side of the emitting surface, and a second cover portion covering an edge of another side of the emitting surface.

The first cover portion may be configured to cover a portion in which the emitting surface is connected to one side surface of the reflective member. The second cover portion may be configured to cover a portion in which the emitting surface is connected to another side surface of the reflective member.

The cover portion may further include a third cover portion. The third cover portion may be configured to cover a portion in which the emitting surface is connected to the reflective surface.

The holder may include: a mounting surface on which the reflective member is mounted; a first side portion disposed to surround one side surface of the reflective member; and a second side portion disposed to surround another side surface of the reflective member.

The cover portion may include a first cover portion and a second cover portion extending toward each other from the first side portion and the second side portion. The first cover portion and the second cover portion may cover portions of the emitting surface.

Surfaces of the first cover portion and the second cover portion facing each other may be curved surfaces.

Uneven portions configured to scatter light may be respectively provided on the surfaces of the first cover portion and the second cover portion facing each other.

A light blocking layer may be provided on the surfaces of the first cover portion and the second cover portion facing each other.

The reflection module may further include a third cover portion extending in a direction perpendicular to an optical axis from the mounting surface, and covering a portion of the emitting surface.

The third cover portion may be configured to cover a portion in which the emitting surface is connected to the reflective surface. The third cover portion may include protrusions.

The reflection module may further include a light blocking layer disposed on the protrusions.

In another general aspect, a camera module includes: a lens module including lenses; a housing accommodating the lens module; and a reflection module disposed in front of the lens module. The reflection module includes a holder, and a reflective member mounted on the holder and configured to change a path of incident light. The camera module further includes: an image sensor module configured to receive light passing through the lens module; and a case coupled to the housing. The reflective member includes an incident surface, a reflective surface, and an emitting surface. The holder includes a cover portion covering a portion of the emitting surface. An area of the cover portion covering the emitting surface increases in a direction toward a lower portion of the emitting surface.

The cover portion may include a first cover portion covering an edge of one side of the emitting surface, and a second cover portion covering an edge of another side of the emitting surface. The first cover portion and the second cover portion may each include a curved surface.

The case may include an opening through which the incident light passes. Either one or both of protrusions and a light blocking layer are disposed on an inner side surface of the opening.

The case may include an opening through which the incident light passes. A length of the opening in an optical axis direction of the lens module may be shorter than a length of the opening in a direction perpendicular to the optical axis direction.

The case may include an opening through which the incident light passes. The opening may include: a first inner side surface and a second inner side surface disposed opposite each other with respect to a center of the opening; and a third inner side surface and a fourth side surface disposed opposite each other with respect to the center of the opening, and respectively connecting the first and second inner side surfaces to each other. A shortest distance between the first inner side surface and the second inner side surface may be longer than a shortest distance between the third inner side surface and the fourth inner side surface.

A length of at least one lens, among the lenses, in a first direction perpendicular to an optical axis may be shorter than a length of the at least one lens in a second direction perpendicular to the optical axis and the first direction. The at least one lens may be disposed such that a side surface of the at least one lens facing the first direction faces a bottom surface of the housing. A portion of the bottom surface of the housing disposed between the lens module and the image sensor module may include a groove portion.

The groove portion may include an inclined surface.

Protrusions may be disposed in the groove portion. Each of the protrusions may include a convex curved surface.

In another general aspect, a reflection module includes: a holder; and a reflective member mounted on the holder and including an incident surface, a reflective surface, and an emitting surface. The holder includes a cover portion covering a bottom edge of the emitting surface at which the emitting surface is connected to the reflective surface. The cover portion includes protrusions configured to scatter light.

The protrusions may have a triangular columnar shape.

The cover portion may be connected to additional cover portions respectively covering opposing side edges of the emitting surface.

An area of each of the additional cover portions may increase in a direction toward the bottom edge of the emitting surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
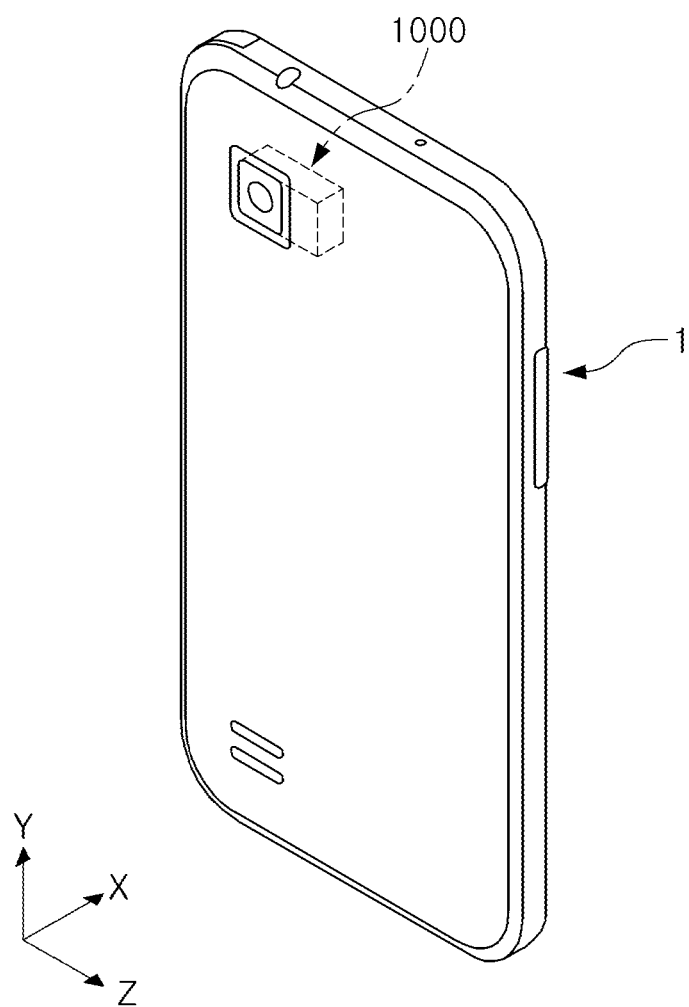
FIG. 1 is a perspective view of a portable electronic device in which a camera module is mounted, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

FIG. 1 is a perspective view of a portable electronic device on which a camera module according to an embodiment of the present disclosure is mounted.

Referring to FIG. 1, a portable electronic device 1, according to an embodiment, may be a mobile communication terminal, a smart phone, a tablet PC, or the like, on which a camera module 1000, is mounted.

As illustrated in FIG. 1, the camera module 1000 is mounted on the portable electronic device 1 to image a subject. The camera module 1000 includes, for example, a plurality of lenses, and an optical axis (a Z-axis) of the plurality of lenses may be directed in a direction perpendicular to a thickness direction (a Y-axis direction, which is a direction from a front surface of the portable electronic device 1 toward a rear surface of the portable electronic device 1, or vice versa) of the portable electronic device.

For example, the optical axis (the Z-axis) of the plurality of lenses disposed in the camera module 1000 may be formed in the width direction or the length direction of the portable electronic device 1. Therefore, even if functions such as auto focusing (hereinafter, referred to as AF), optical zoom (hereinafter, referred to as zoom) and optical image stabilizing (hereinafter, referred to as 01S), or the like are provided in the portable electronic device 1, it is possible to prevent the thickness of the portable electronic device 1 from increasing. Accordingly, the portable electronic device 1 may be thinned.

The camera module 1000 may have any one or any combination of any two or more of AF, zoom, and OIS functions.

Since a conventional camera module including AF, zoom, OIS functions, and the like (hereinafter, "enhanced camera module"), needs to be provided with various parts, the size of the enhanced camera module is generally increased compared to a general camera module. When the size of the enhanced camera module increases, it may be difficult to reduce the thickness of the portable electronic device on which the enhanced camera module is mounted. For example, the enhanced camera module may include a plurality of lens groups for the zoom function. When the plurality of lens groups are disposed in the thickness direction of the portable electronic device, the thickness of the portable electronic device also increases according to the number of lens groups. Accordingly, if the thickness of the portable electronic device is not increased, the number of lens groups cannot be sufficiently secured, and thus the zoom performance may be weakened.

In addition, to implement the AF, zoom, and OIS functions in the enhanced camera module, an actuator configured to move a plurality of lens groups in the optical axis direction (a Z-axis direction) or a direction perpendicular to the optical axis direction may be installed. When the optical axis (the Z-axis) of the lens group is formed in the thickness direction of the portable electronic device, an actuator for moving the lens group may also be installed in the thickness direction of the portable electronic device. Therefore, the thickness of the portable electronic device is increased.

However, since, in the camera module 1000, the optical axes (the Z-axis) of the plurality of lenses are disposed to be perpendicular to the thickness direction of the portable electronic device 1, even if the camera module 1000 provided with the AF, zoom, and OIS functions is mounted thereon, the portable electronic device 1 can be thinned.

Figure 2:
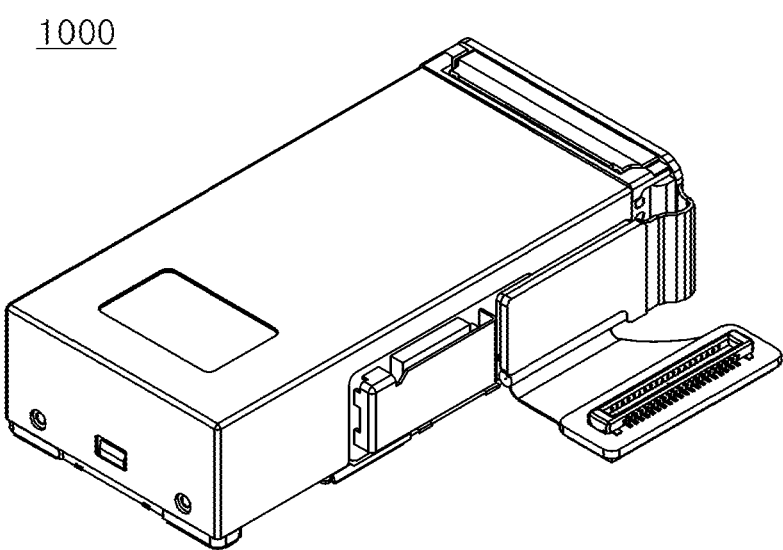
FIG. 2 a schematic perspective view of the camera module of FIG. 1, according to an embodiment.
Figure 3:
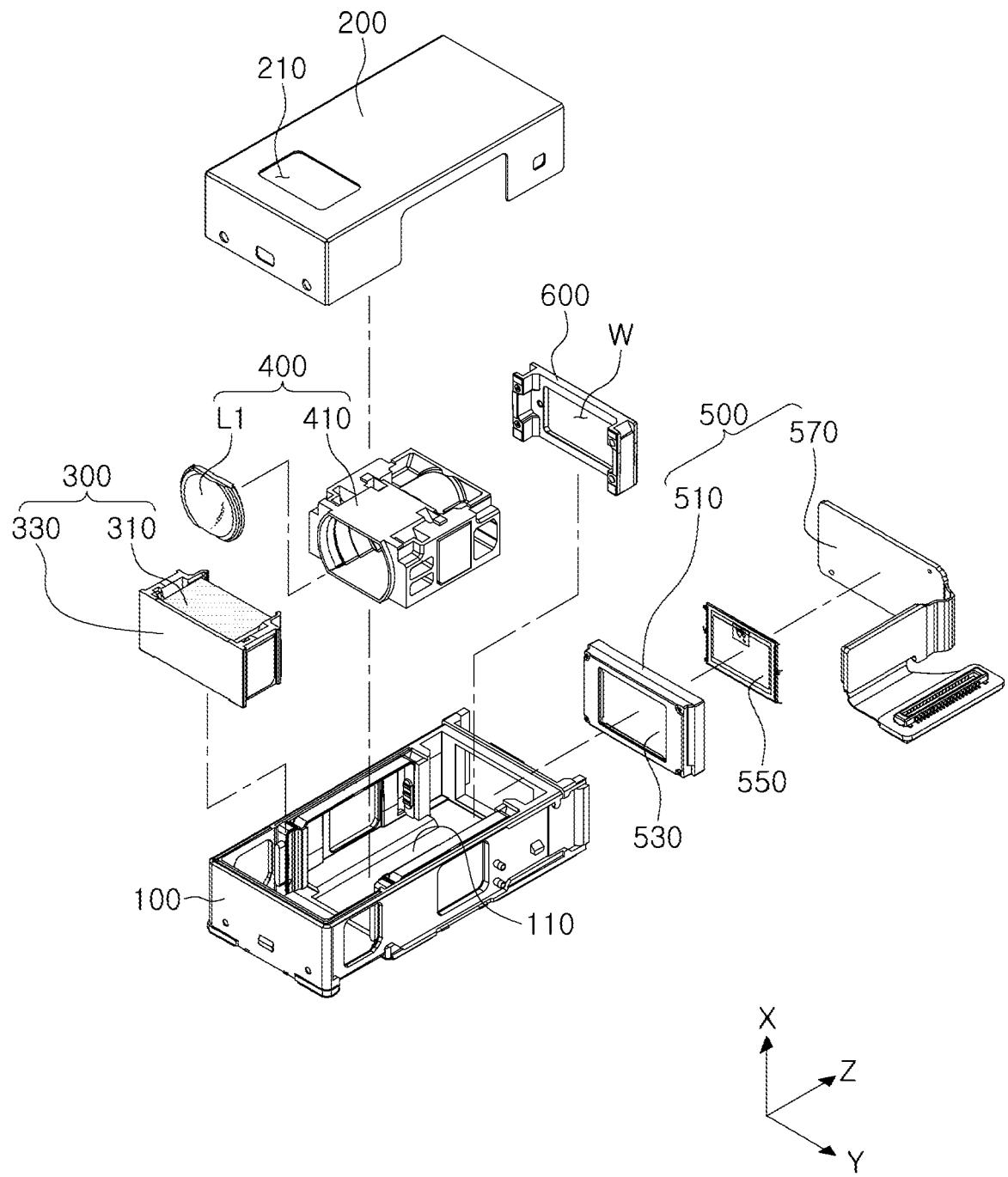
FIG. 3 is a schematic exploded perspective view of the camera module of FIG. 1.
Figure 4:
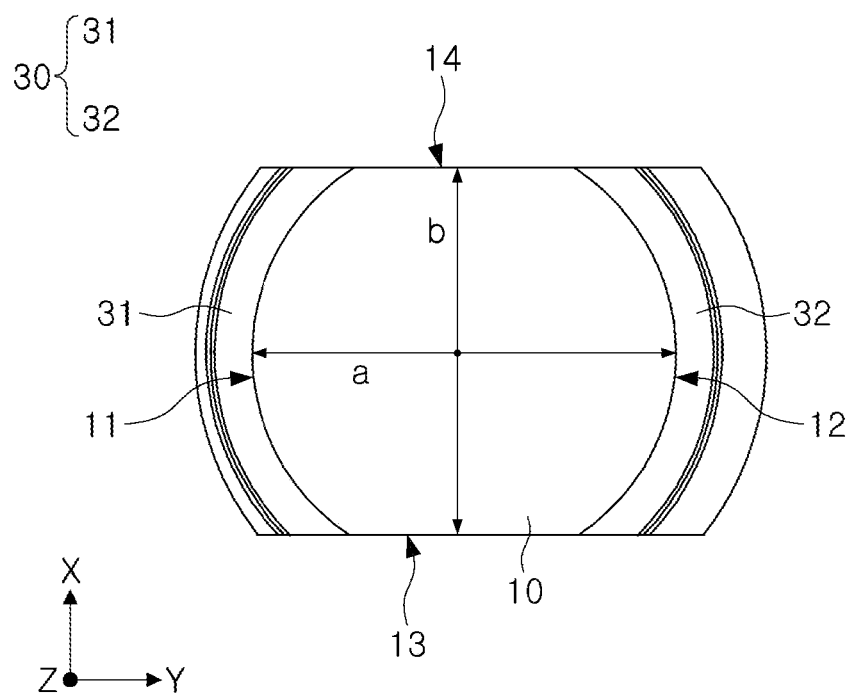
FIG. 4 is a plan view of a lens included in the camera module of FIG. 1, according to an embodiment.

FIG. 2 is a schematic perspective view of the camera module 1000, according to an embodiment. FIG. 3 is a schematic exploded perspective view of the camera module 1000, according to an embodiment. FIG. 4 is a schematic perspective view of a first lens L1 disposed in the camera module 1000, according to an embodiment.

First, referring to FIG. 2, the camera module 1000 may include, for example, a housing 100, a reflection module 300, a lens module 400, an image sensor module 500, and a case 200.

The reflection module 300, the lens module 400, and the image sensor module 500 are disposed inside the housing 100 from one side of the housing 100 to another, opposite side of the housing 100. The housing 100 has an internal space to accommodate the reflection module 300, the lens module 400, and the image sensor module 500. However, the image sensor module 500 may be attached to an outside of the housing 100.

FIGS. 2 and 3 illustrate an embodiment in which the reflection module 300, the lens module 400, and the image sensor module 500 are disposed inside the housing 100. However, in contrast to the embodiments of FIGS. 2 and 3, the reflection module 300 may be disposed outside the housing 100, and in this case, one side of the housing 100 may be open so that light transmitted from the reflection module 300 passes through the housing 100. In addition, in an example in which the reflection module 300 is disposed outside the housing 100, the reflection module 300 may be accommodated in a separate housing. The housing 100 may have a box shape with an open top, for example.

The case 200 is coupled to the housing 100 to cover the upper portion of the housing 100. The case 200 has an opening 210 through which light is incident. A moving direction of the light incident through the opening 210 is changed by the reflection module 300, and is incident on the lens module 400.

As described above, the reflection module 300 is configured to change the moving direction of light. As an example, the moving direction of light incident into the interior of the housing 100 may be changed so as to face the lens module 400 through the reflection module 300. The reflection module 300 includes, for example, a reflective member 310 and a holder 330 on which the reflective member 310 is mounted. The reflective member 310 is configured to change the moving direction of light. For example, the reflective member 310 may be a mirror or a prism configured to reflect light.

The lens module 400 includes a plurality of lenses through which light of which a moving direction is changed by the reflective member 310, and a lens barrel 410 accommodating the plurality of lenses. In FIG. 3, only a lens L1 (hereinafter referred to as a first lens) disposed closest to an object side, among the plurality of lenses, is illustrated for convenience of description.

The image sensor module 500 includes a sensor housing 510, an infrared cut filter 530, an image sensor 550, and a printed circuit board 570. The infrared cut filter 530 may be mounted on the sensor housing 510. The infrared cut filter 530 functions to block light in an infrared region from among the light that has passed through the lens module 400. The printed circuit board 570 is coupled to the sensor housing 510, and the image sensor 550 is disposed on the printed circuit board 570. The light passing through the lens module 400 is received by the image sensor module 500 (e.g., the image sensor 550).

At least one lens among the plurality of lenses has a non-circular planar shape. For example, the first lens L1 is non-circular, when viewed from the optical axis direction (Z-axis direction). That is, the first lens L1 may be non-circular in an XY plane. It is also possible for every lens of the plurality of lenses to have a non-circular planar shape. Referring to FIG. 4, on a plane perpendicular to the optical axis (Z axis), a length of the first lens L1 in a first direction (X-axis direction) perpendicular to the optical axis (Z axis) is shorter than a length of the first lens L1 in a second direction (Y-axis direction) perpendicular to the optical axis (Z axis) and the first direction (X-axis direction). For example, the first lens L1 has a major axis and a minor axis. A line segment connecting both sides of the first lens L1 in the first direction (X-axis direction) while passing through the optical axis (Z axis) is a minor axis, and a line segment connecting both sides of the first lens L1 in the second direction (Y-axis direction) while passing through the optical axis (Z axis) is a major axis. The major axis and the minor axis are perpendicular to each other, and the length of the major axis is longer than the length of the minor axis.

As illustrated in FIG. 4, the first lens L1 includes an optical portion 10 and a flange portion 30. The optical portion 10 may be a portion in which optical performance of the first lens L1 is exhibited. For example, light reflected from a subject may pass through the optical portion 10 and be refracted. The optical portion 10 has refractive power, and may have an aspherical shape. The flange portion 30 may be configured to fix the first lens L1 to another configuration, for example, the lens barrel 410 or another lens. The flange portion 30 may extend from the optical portion 10, and may be integrally formed with the optical portion 10.

The optical portion 10 is formed in a non-circular shape. For example, the optical portion 10 is non-circular, when viewed from the optical axis direction (Z-axis direction). That is, the optical portion 10 may be non-circular in an XY plane. Referring to FIG. 4, on a plane perpendicular to the optical axis (Z axis), a length of the optical portion 10 in a first direction (X-axis direction) perpendicular to the optical axis (Z axis) is shorter than a length of the optical portion 10 in a second direction (Y-axis direction) perpendicular to the optical axis (Z axis) and the first direction (X-axis direction).

The optical portion 10 includes a first edge 11, a second edge 12, a third edge 13, and a fourth edge 14. When viewed from the optical axis direction (Z-axis direction), the first edge 11 and the second edge 12 each have an arc shape. That is, the first edge 11 and the second edge 12 each have an arc shape in an XY plane.

The second edge 12 is disposed on a side of the optical portion 10 that is opposite a side of the optical portion 10 on which the first edge 11 is disposed. In addition, the first edge 11 and the second edge 12 are positioned to face each other with respect to the optical axis (Z axis). The fourth edge 14 is provided on a side of the optical portion 10 that is opposite a side of the optical portion 10 on which the third edge 13 is disposed. In addition, the third edge 13 and the fourth edge 14 are positioned to face each other with respect to the optical axis (Z axis). The third edge 13 and the fourth edge 14 connect the first edge 11 and the second edge 12 to each other, respectively. The third edge 13 and the fourth edge 14 are symmetrical with respect to the optical axis (Z axis), and may be formed to be parallel to each other.

When viewed in the optical axis direction (Z-axis direction), the first edge 11 and the second edge 12 have an arc shape, and the third edge 13 and the fourth edge 14 generally have a straight (linear) shape. That is the first edge 11 and the second edge 12 each have an arc shape in an XY plane, and the third edge 13 and the fourth edge 14 each generally have a straight shape in an XY plane.

The optical portion 10 has a major axis (a) and a minor axis (b). A line segment connecting the third edge 13 and the fourth edge 14 with the shortest distance while passing through the optical axis (Z axis) is a minor axis (b), and a line segment connecting the first edge 11 and the second edge 12 while passing through the optical axis (Z axis) and disposed perpendicular to the minor axis (b) is a major axis (a). The length of the major axis (a) is longer than the length of the minor axis (b).

The flange portion 30 extends in the second direction (Y-axis direction) along a periphery of a portion of the optical portion 10. At least a portion of the flange portion 30 is in contact with an inner side surface of the lens barrel 410.

The flange portion 30 includes a first flange portion 31 and a second flange portion 32. The first flange portion 31 extends from the first edge 11 of the optical portion 10, and the second flange portion 32 extends from the second edge 12 of the optical portion 10.

The first edge 11 of the optical portion 10 may be a portion adjacent to the first flange portion 31, and the second edge 12 of the optical portion 10 may be a portion, adjacent to the second flange portion 32. The third edge 13 of the optical portion 10 may be one side surface of the optical portion 10, in which the flange portion 30 is not formed, and the fourth edge 14 of the optical portion 10 may be another side surface of the optical portion 10 in which the flange portion 30 is not formed.

Referring to FIG. 3, the first lens L1 is disposed so that one of the side surfaces facing the first direction (X-axis direction) faces the bottom surface 110 of the housing 100, and is disposed so that side surfaces facing the second direction (Y-axis direction) face the inner side surfaces of the housing 100, respectively. That is, the first lens L1 is disposed so that the side surfaces facing the first direction (X-axis direction) face the thickness direction (X-axis direction) of the housing 100, and is disposed so that the side surfaces facing the second direction (Y-axis direction) face the width direction (Y-axis direction) of the housing 100. Since the length of the first lens L1 in the first direction (X-axis direction) is formed to be shorter than the length of the first lens L1 in the second direction (Y-axis direction), the thickness of the housing 100 may be reduced.

Figure 5:
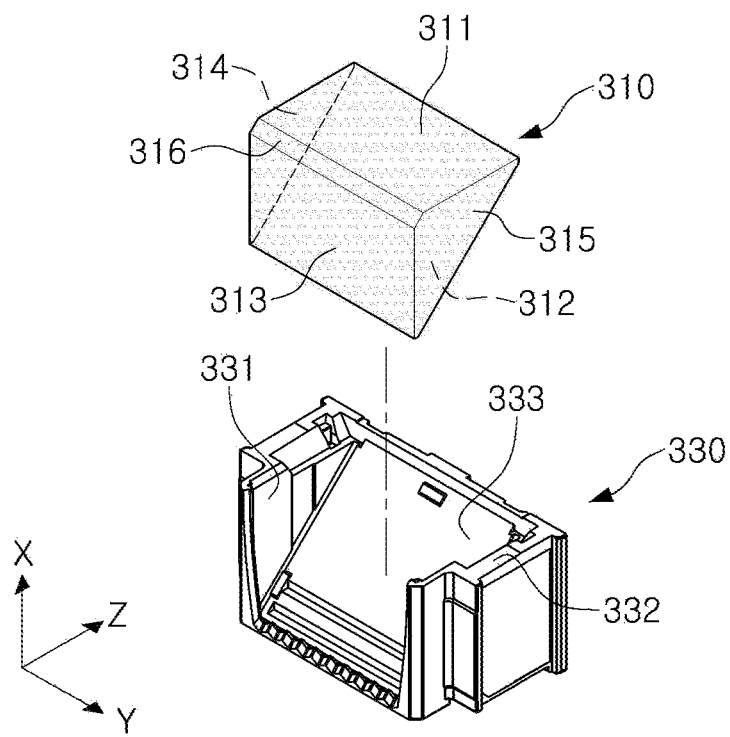
FIG. 5 is a schematic exploded perspective view of a reflection module, according to an embodiment.
Figure 6:
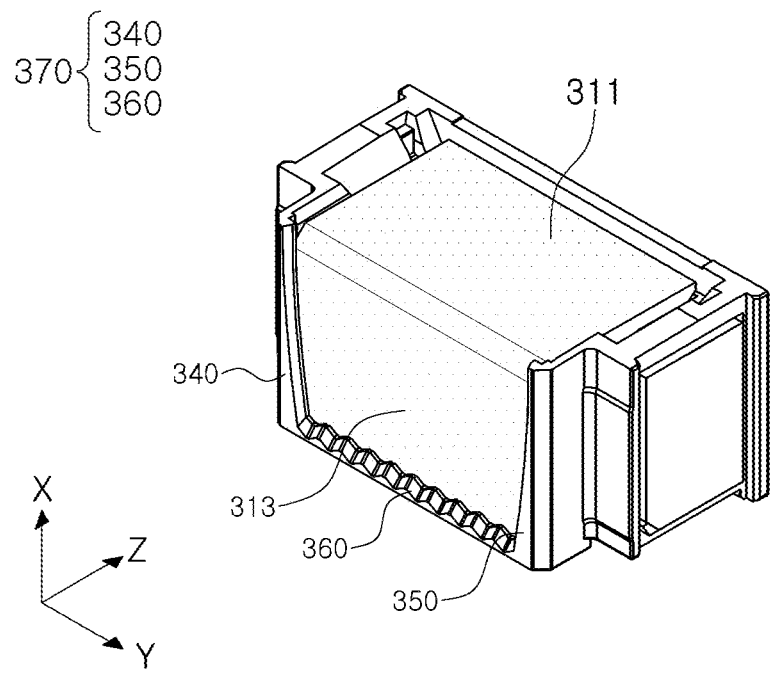
FIG. 6 is a schematic coupled perspective view of the reflection module of FIG. 5, according to an embodiment.
Figure 7:
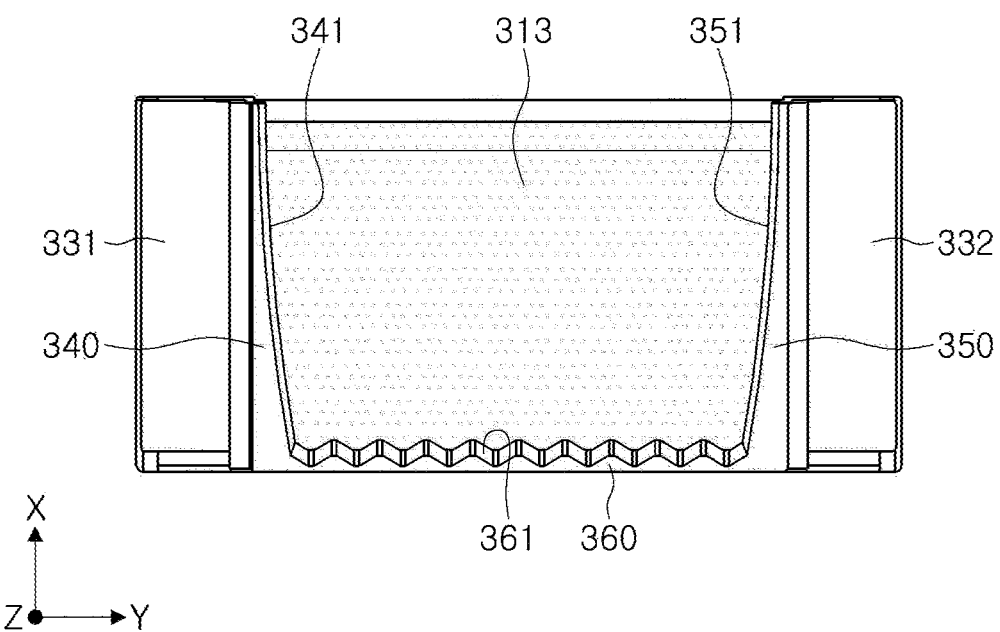
FIG. 7 is a schematic front view of the reflection module of FIG. 5, according to an embodiment.

FIG. 5 is a schematic exploded perspective view of the reflection module 300, according to an embodiment. FIG. 6 is a coupled perspective view of the reflection module 300, according to an embodiment. FIG. 7 is a schematic front view of the reflection module 300, according to an embodiment.

Referring to FIGS. 5 to 7, the reflection module 300 includes the reflective member 310, and the holder 330 on which the reflective member 310 is mounted.

As described above, the reflective member 310 is configured to change a moving direction of light. The reflective member 310 may be a prism, but may alternatively be a mirror.

The reflective member 310 may have a shape obtained by dividing a rectangular parallelepiped or a cube in a diagonal direction, and includes an incident surface 311, a reflective surface 312, and an emitting surface 313. The reflective member 310 includes three square surfaces and two triangular surfaces. For example, the incident surface 311, the reflective surface 312, and the emitting surface 313 of the reflective member 310 have a rectangular shape, and both side surfaces 314 and 315 of the reflective member 310 are substantially triangular.

If an edge at which the incident surface 311 and the emitting surface 313 are connected were formed as a sharp shape, there would be a risk of this edge being damaged by impacts. If the edge connecting the incident surface 311 and the emitting surface 313 were to be damaged due to impacts, a flare phenomenon may be caused due to unintended reflection of light.

Therefore, a chamfered portion 316 may be formed at an edge of the reflective member 310 at which the incident surface 311 and the emitting surface 313 are connected to prevent damage to the reflective member 310 due to impacts, or the like.

For example, the chamfered portion 316 is formed to have a predetermined angle with respect to the incident surface 311 and the emitting surface 313. An angle between the chamfered portion 316 and the incident surface 311 and an angle between the chamfered portion 316 and the emitting surface 313 may be obtuse angles.

A light blocking layer may be disposed in or on the chamfered portion 316. As an example, the light blocking layer may be formed by attaching a light blocking film to the chamfered portion 316 or painting a light blocking paint.

The holder 330 has a first side portion 331 and a second side portion 332 surrounding both side surfaces of the reflective member 310. The first side portion 331 is disposed to surround one side surface 314 of the reflective member 310, and the second side portion 332 is disposed to surround the other side surface 315 of the reflective member 310.

In addition, the holder 330 includes a mounting surface 333 on which the reflective member 310 is mounted. The mounting surface 333 may be disposed between the first side portion 331 and the second side portion 332. The mounting surface 333 may be configured as an inclined surface.

For example, the mounting surface 333 may be an inclined surface, inclined by 45° with respect to the optical axis (Z axis) of the plurality of lenses. The reflective surface 312 of the reflective member 310 is coupled to the mounting surface 333. Light that has passed through the incident surface 311 is reflected by the reflective surface 312 and passes through the emitting surface 313.

However, when light that has passed through the incident surface 311 is reflected from a portion other than the reflective surface 312 (for example, the side surfaces 314 and 315 of the reflective member 310), a flare phenomenon may be caused.

In addition, since not all light reflected from the reflective surface 312 is used for image formation, even if light is reflected from the reflective surface 312, light not used for image formation may cause a flare phenomenon.

The camera module 1000 is configured such that the holder 330 covers a portion of the emitting surface 313 of the reflective member 310 to prevent a flare phenomenon occurring due to unnecessary light.

For example, the holder 330 includes a cover portion 370 configured to cover a portion of the emitting surface 313 of the reflective member 310. For example, the cover portion 370 may be configured to cover edges on opposite sides of the emitting surface 313 of the reflective member 310.

The cover portion 370 includes a first cover portion 340 and a second cover portion 350.

The first cover portion 340 extends from the first side portion 331 in one direction perpendicular to the optical axis (Z axis) (for example, in one Y-axis direction), and the second cover portion 350 extends from the second side portion 332 in another direction perpendicular to the optical axis (Z axis) (for example, in another Y-axis direction opposite the one Y-axis direction). For example, the first cover portion 340 and the second cover portion 350 are disposed to extend toward each other.

The first cover portion 340 and the second cover portion 350 respectively cover a portion of the emitting surface 313 of the reflective member 310. The first cover portion 340 may be configured to cover an edge of one side of the emitting surface 313, and the second cover portion 350 may be configured to cover an edge of another side of the emitting surface 313 opposite the one side of the emitting surface 313.

For example, the first cover portion 340 may be disposed to surround, or cover, a portion of the emitting surface 313 connected to the one side surface 314 of the reflective member 310, and the second cover portion 350 may be disposed to surround, or cover, a portion of the emitting surface 313 connected to the other side surface 315 of the reflective member 310.

The cover portion 370 may be configured such that an area covering the emitting surface 313 of the reflective member 310 increases in a direction toward the bottom surface 110 of the housing 100.

For example, the first cover portion 340 and the second cover portion 350 may each have a shape in which an area of each of the first cover portion 340 and the second cover portion 350 covering the emitting surface 313 of the reflective member 310 increases toward the bottom surface 110 of the housing 100.

The first cover portion 340 and the second cover portion 350 have surfaces 341 and 351 facing each other. The surfaces 341 and 351 may be curved.

An uneven portion may be formed on surfaces 341 and 351 where the first cover portion 340 and the second cover portion 350 face each other, or a light blocking layer may be disposed on the surfaces 341 and 351 to scatter light. For example, the uneven portion may be a surface formed roughly by a corrosion treatment, and the light blocking layer may be formed by attaching a light blocking film or painting a light blocking paint on the surfaces 341 and 351.

Since unnecessary light may be blocked by the first cover portion 340 and the second cover portion 350, and light can be scattered by an uneven portion provided on the surfaces 341 and 351 where the first cover portion 340 and the second cover portion 350 face each other, a flare phenomenon may be suppressed.

The cover portion 370 further includes a third cover portion 360. The third cover portion 360 may be disposed to cover a portion of the emitting surface 313 of the reflective member 310. For example, the third cover portion 360 may be disposed to surround, or cover, a portion of the emitting surface 313 that is connected to the reflective surface 312 of the reflective member 310.

The third cover portion 360 is configured to connect the first cover portion 340 and the second cover portion 350 to each other, and may extend from the other end of the mounting surface 333 of the holder 330 in a direction perpendicular to the optical axis (Z axis), (for example, a first direction (X-axis direction)).

The third cover portion 360 includes protrusions 361. Each of the protrusions 361 may be connected to each other, and each of the protrusions 361 may have a triangular columnar shape. A light blocking layer may be provided on the protrusions 361. The light blocking layer may be formed by attaching a light blocking film to the protrusions 361 or by painting a light blocking paint on the protrusions 361.

Since unnecessary light may be blocked by the third cover portion 360, and light may be scattered by the plurality of protrusions 361 of the third cover portion 360, a flare phenomenon may be suppressed.

Figure 8:
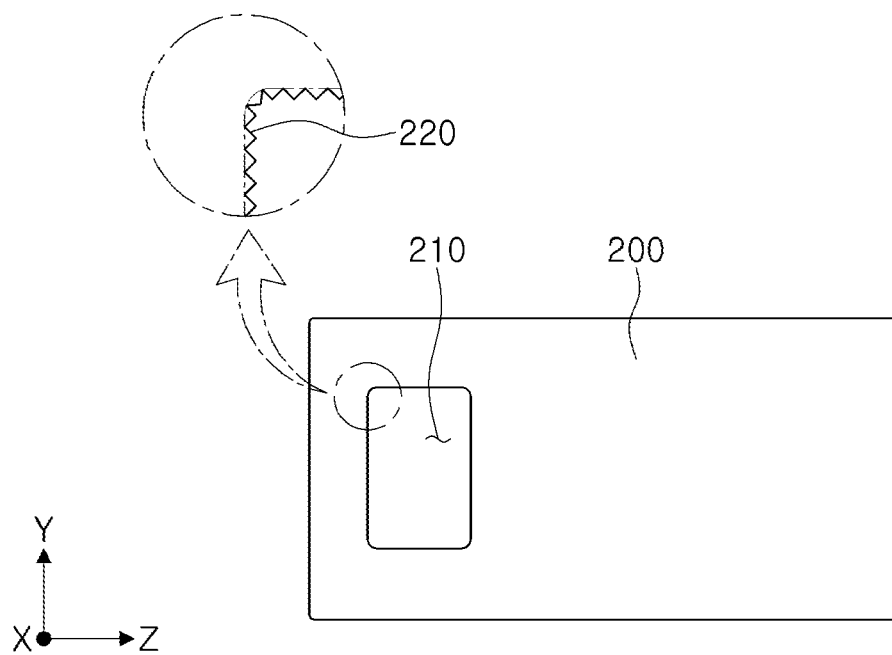
FIG. 8 is a schematic plan view of a case, according to an embodiment.
Figure 9:
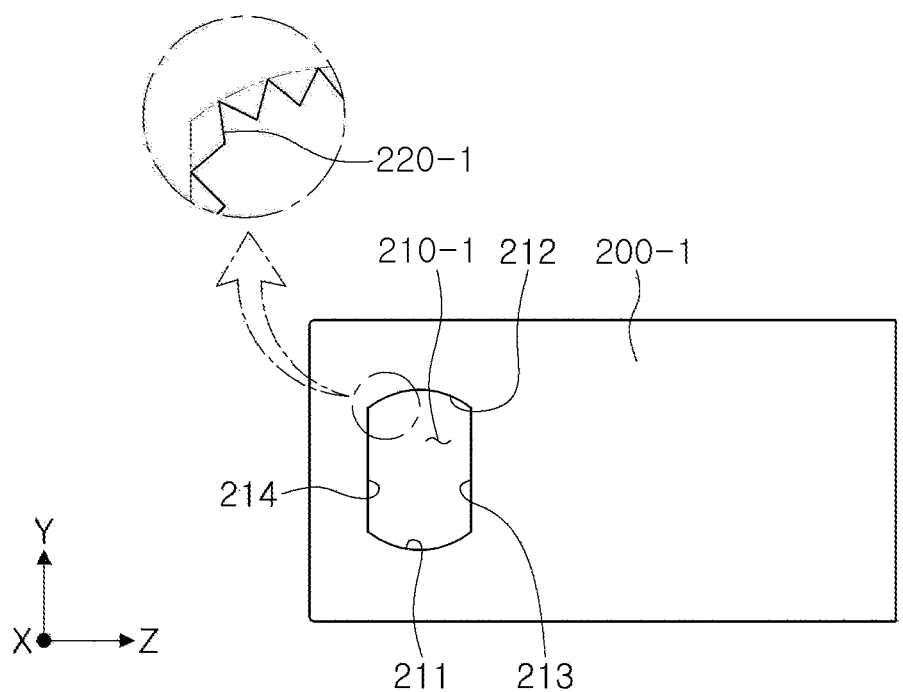
FIG. 9 is a schematic plan view of a case, according to an embodiment.
Figure 10:
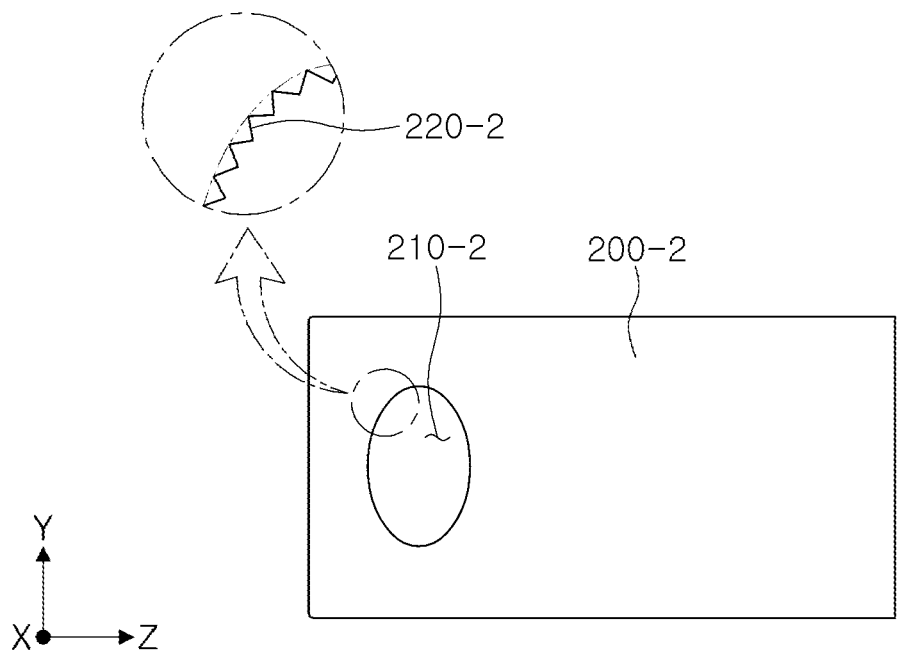
FIG. 10 is a schematic plan view of a case, according to an embodiment.

FIG. 8 is a schematic plan view of the case 200, according to an embodiment. FIG. 9 is a schematic plan view of a case 200-1, according to an embodiment. FIG. 10 is a schematic plan view of a case 200-2, according to an embodiment.

Referring to FIG. 8, the case 200 includes an opening 210 through which light is incident. The opening 210 may have a shape substantially corresponding to the incident surface 311 of the reflective member 310. For example, the opening 210 may have a rectangular shape and may have four inner side surfaces.

Since the four inner side surfaces of the opening 210 are generally linear, diffraction patterns (i.e., flares) may occur in a captured image due to the diffraction phenomenon of light passing through this portion. Thus, either one or both of an uneven portion 220 and a light blocking layer may be provided on at least one of the four inner side surfaces of the opening 210. For example, the uneven portion 220 may be a surface formed roughly by a corrosion treatment, and may have a shape in which a plurality of protrusions are connected to each other. The light blocking layer may be formed by attaching a light blocking film to at least one of the four inner side surfaces of the opening 210, or by painting a light blocking paint on at least one of the four inner side surfaces of the opening 210. Therefore, it is possible to suppress the occurrence of diffraction fringes (i.e., flares).

Referring to FIG. 9, a shape of an opening 210-1 of the case 200-1 may correspond to the shape of the first lens L1.

For example, a length of the opening 210-1 in the optical axis direction (Z-axis direction) is shorter than a length of the opening 210-1 in a direction perpendicular to the optical axis (Z-axis) (for example, in the second direction (Y-axis direction)).

The opening 210-1 includes a first inner side surface 211, a second inner side surface 212, a third inner side surface 213 and a fourth inner side surface 214.

Each of the first inner side surface 211 and the second inner side surface 212 has an arc shape.

The second inner side surface 212 is disposed on a side of the opening 210-1 opposite a side of the opening 210-1 on which the first inner side surface 211 is disposed. In addition, the first inner side surface 211 and the second inner side surface 212 are positioned to face each other with respect to the center of the opening 210-1.

The fourth inner side surface 214 is disposed on a side of the opening 210-1 opposite a side of the opening 210-1 on which the third inner side surface 213 is disposed. In addition, the third inner side surface 213 and the fourth inner side surface 214 are positioned to face each other with respect to the center of the opening 210.

The third inner side surface 213 and the fourth inner side surface 214 connect the first inner side surface 211 and the second inner side surface 212 to each other. The third inner side surface 213 and the fourth inner side surface 214 are symmetrical with respect to the center of the opening 210, and may be formed parallel to each other.

The first inner side surface 211 and the second inner side surface 212 each have an arc shape, and the third inner side surface 213 and the fourth inner side surface 214 each have generally straight (linear) shapes.

A shortest distance between the first inner side surface 211 and the second inner side surface 212 is longer than a shortest distance between the third inner side surface 213 and the fourth inner side surface 214.

Either one or both of an uneven portion 220-1 and a light blocking layer may be provided on at least one of the first to fourth inner side surfaces 211, 212, 213, and 214. For example, the uneven portion 220-1 may be a surface formed roughly by a corrosion treatment, and may have a shape in which a plurality of protrusions are connected to each other. The light blocking layer may be formed by attaching a light blocking film to at least one of the first to fourth inner side surfaces 211, 212, 213, and 214 or by painting a light blocking paint on at least one of the first to fourth inner side surfaces 211, 212, 213, and 214. Therefore, it is possible to suppress the occurrence of diffraction fringes (i.e., flares).

For example, an area of the opening 210-1 of the embodiment of FIG. 9 is smaller than an area of the opening 210 of the embodiment of FIG. 8.

Referring to FIG. 10, a shape of an opening 210-2 of the case 200-2 may be an oval shape. Therefore, a length of the opening 210-2 in the optical axis direction (Z axis direction) is shorter than the length of the opening 210-2 in the direction perpendicular to the optical axis (Z axis) (for example, in the second direction (Y axis direction)).

Either one or both of an uneven portion 220-2 and a light blocking layer may be provided on at least a portion of inner side surfaces of the opening 210-2. For example, the uneven portion 220 may be a surface formed roughly by a corrosion treatment, and may have a shape in which a plurality of protrusions are connected to each other. The light blocking layer may be formed by attaching a light blocking film to at least a portion of the inner side surfaces of the opening 210-2 or by painting a light blocking paint on at least a portion of the inner side surfaces of the opening 210-2. Therefore, it is possible to suppress the occurrence of diffraction fringes (i.e., flares).

For example, an area of the opening 210-2 of the embodiment of FIG. 10 is smaller than the area of the opening 210-1 of the embodiment of FIG. 9.

Figure 11:
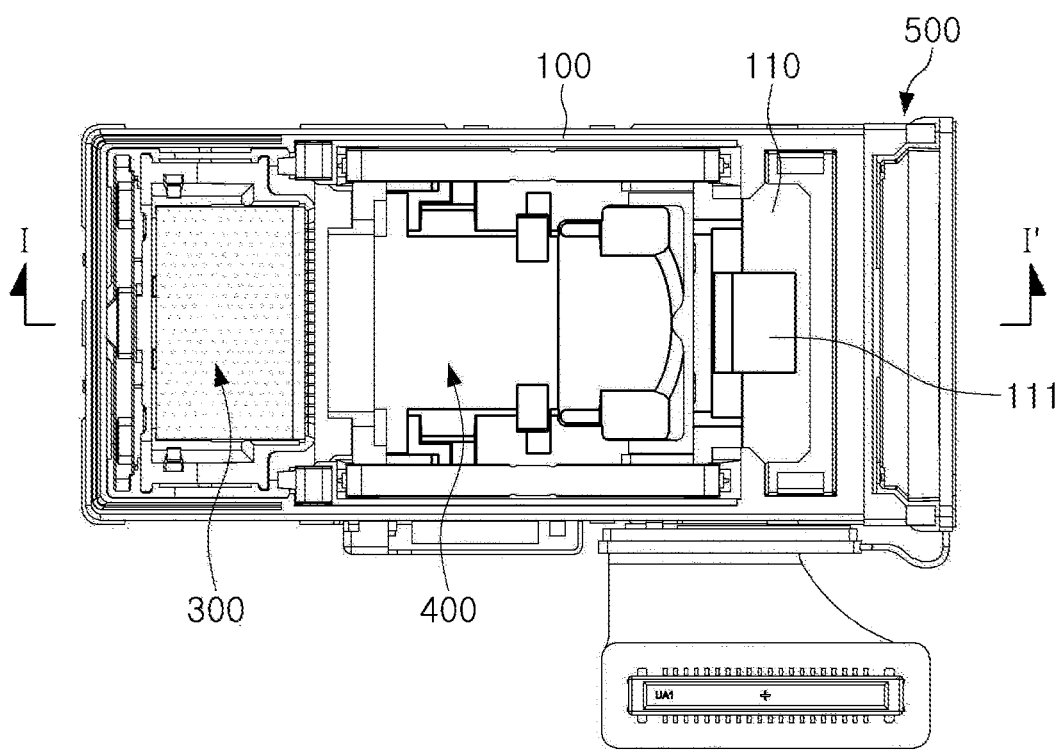
FIG. 11 is a plan view schematically illustrating a state in which the case is removed from the camera module of FIG. 1.
Figure 12:
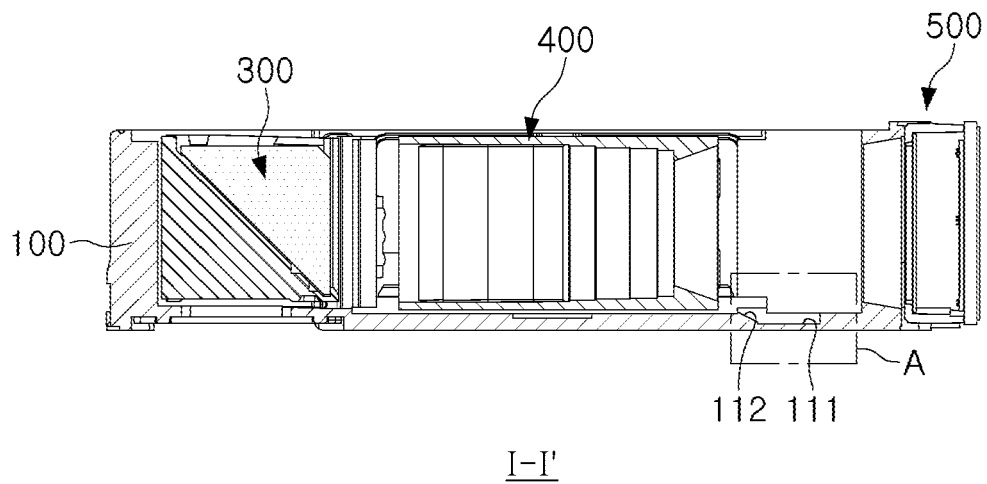
FIG. 12 is a cross-sectional view taken along line I-I' of FIG. 11.
Figure 13:
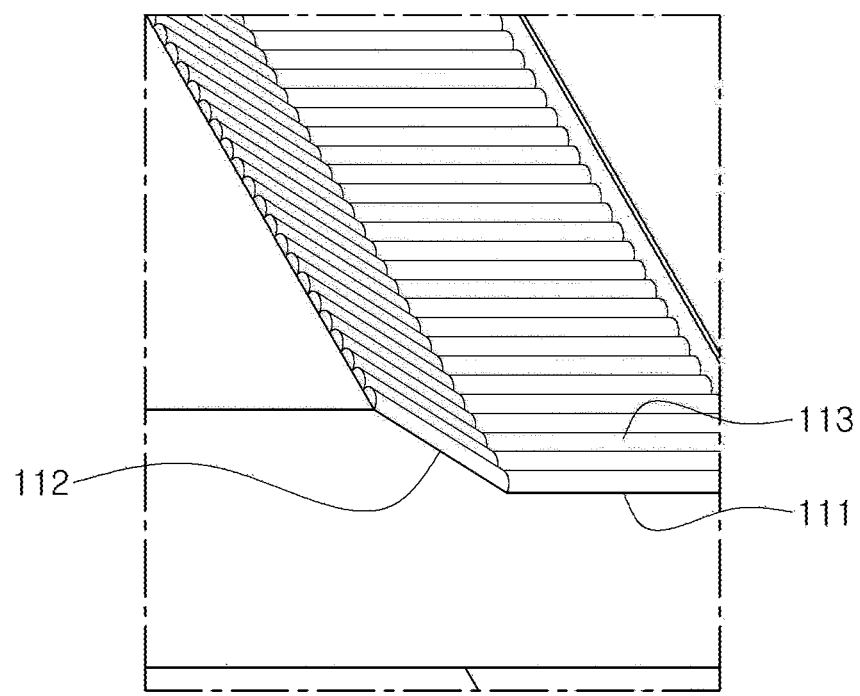
FIG. 13 is an enlarged perspective view of portion A of FIG. 12.

FIG. 11 is a plan view schematically illustrating a state in which a case (e.g., the case 200, 200-1, or 200-2) is removed from the camera module 1000. FIG. 12 is a cross-sectional view of I-I' of FIG. 11. FIG. 13 is an enlarged perspective view of portion A of FIG. 12.

Since the thickness direction of the housing 100 (X-axis direction) and the thickness direction of the portable electronic device 1 (X-axis direction) are approximately identical, the thickness of the housing 100 needs to be reduced to reduce the thickness of the portable electronic device 1.

Since the length of the minor axis (b) of the first lens L1 is shorter than the length of the major axis (a) of the first lens L1, the thickness of the housing 100 may be reduced.

Since the minor axis (b) of the first lens L1 is disposed in the thickness direction (X-axis direction) of the housing 100, in order to further reduce the thickness of the housing 100, the third edge 13 or the fourth edge 14 of the first lens L1, and the bottom surface 110 of the housing 100 need to be disposed close to each other. However, when the third edge 13 or the fourth edge 14 of the first lens L1, and the bottom surface 110 of the housing 100 are disposed close to each other, some light may hit the bottom of the housing 100 and be reflected, and there is a concern that the reflected light is incident on the image sensor 550 to cause a flare phenomenon.

Although the description herein is made based on the first lens L1, there is a concern that a flare phenomenon may occur as described above, even when a lens other than the first lens L1 among the plurality of lenses has a shape corresponding to the first lens L1. The camera module 1000 a is configured to prevent a flare phenomenon from occurring due to internal reflection generated from the bottom surface 110 of the housing 100.

For example, a groove portion 111 may be provided on the bottom surface 110 of the housing 100. The groove portion 111 is provided in a space between the lens module 400 and the image sensor module 500. The groove portion 111 may include an inclined surface 112.

Since the groove portion 111 is formed in the bottom surface 110 of the housing 100, even if some of the light that has passed through the lens module 400 hits the bottom surface 110 of the housing 100 and is reflected, the reflected light may be blocked by the groove portion 111. Accordingly, it is possible to prevent a flare phenomenon due to internal reflection generated from the bottom surface 110 of the housing 100.

The groove portion 111 may include protrusions 113. The protrusions 113 are formed to have a length along the moving direction of light. Each of the plurality of protrusions 113 includes a convex curved surface, and the plurality of protrusions 113 are formed to contact each other.

Therefore, when internal reflection occurs in the groove portion 111 of the housing 100, it is possible to prevent the reflected light from gathering at one point, so that a flare phenomenon may be more effectively suppressed.

Referring to FIG. 3, the camera module 1000 may further include a light blocking plate 600 disposed inside the housing 100. For example, the light blocking plate 600 may be disposed in a space between the groove portion 111 of the housing 100 and the image sensor module 500.

The light blocking plate 600 has a window W in a form of an opening through which light passes through the lens module 400 so as to be incident on the image sensor 550. Even if the groove portion 111 is formed on the bottom surface 110 of the housing 100, unnecessary light may be incident on the image sensor 550 due to diffuse reflection of the light. Thus, the light blocking plate 600 is disposed between the groove portion 111 and the image sensor module 500, so that a flare phenomenon may be more effectively suppressed.

As set forth above, according to embodiments disclosed herein, a reflection module and a camera module including a reflection model may prevent a flare phenomenon.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflection module, comprising:
   a reflective member including an incident surface, a reflective surface, and an emitting surface; and
   a holder on which the reflective member is mounted and including a cover portion covering a portion of the emitting surface,
   wherein the holder comprises a mounting surface on which the reflective member is mounted, a first side portion disposed to surround a first side surface of the reflective member, and a second side portion disposed to surround a second side surface of the reflective member,
   wherein the cover portion comprises a first cover portion covering a first edge in which a first side of the emitting surface connects to the first side surface of the reflective member, a second cover portion covering a second edge in which a second side surface of the emitting surface, opposite the first side of the emitting surface, connects to the second side surface of the reflective member, and a third portion covering a portion in which the emitting surface connects to the reflective surface, and
   wherein an area of the cover portion covering the first edge and the second edge increases progressively from an upper portion in a direction toward a lower portion of the emitting surface.

2. The reflection module of claim 1, wherein the first cover portion and the second cover portion extend toward each other from the first edge and the second edge, and
   wherein the first cover portion and the second cover portion cover portions of the emitting surface.

3. The reflection module of claim 2, wherein surfaces of the first cover portion and the second cover portion facing each other are curved surfaces.

4. The reflection module of claim 2, wherein uneven portions configured to scatter light are respectively provided on the surfaces of the first cover portion and the second cover portion facing each other.

5. The reflection module of claim 2, wherein a light blocking layer is provided on the surfaces of the first cover portion and the second cover portion facing each other.

6. The reflection module of claim 2, wherein the third cover portion extends in a direction perpendicular to an optical axis from the mounting surface, and covers a portion of the emitting surface.

7. The reflection module of claim 6, wherein the third cover portion comprises protrusions.

8. The reflection module of claim 7, further comprising a light blocking layer disposed on the protrusions.

9. A camera module, comprising:
a lens module including lenses;
a housing accommodating the lens module;
a reflection module disposed in front of the lens module, and comprising:
a holder; and
a reflective member mounted on the holder and configured to change a path of incident light;
an image sensor module configured to receive light passing through the lens module; and
a case coupled to the housing and including an opening through which the incident light passes, wherein either one or both of protrusions and a light blocking layer are disposed on an inner side surface of the opening,
wherein the reflective member comprises an incident surface, a reflective surface, an emitting surface, a first side surface disposed on one side of the reflective member, and a second side surface disposed on the other side of the reflective member,
wherein the holder comprises a cover portion covering a portion of the emitting surface, a mounting surface on which the reflective member is mounted, a first side portion disposed to surround the first side surface of the reflective member, and a second side portion disposed to surround the second side surface of the reflective member,
wherein the cover portion of the holder covers a first edge in which a first side of the emitting surface connects to the first side surface of the reflective member and covers a second edge in which a second side surface of the emitting surface, opposite the first side of the emitting surface, connects to the second side surface of the reflective member, and
wherein an area of the cover portion covering the first edge and the second edge increases in a direction toward a lower portion of the emitting surface.

10. The camera module of claim 9, wherein the cover portion comprises a first cover portion covering the first edge and a first portion of the emitting surface adjacent to the first edge, and a second cover portion covering the second edge and a second portion of the emitting surface adjacent to the second edge, and
wherein the first cover portion and the second cover portion each comprise a curved surface.

11. The camera module of claim 9,
wherein a length of the opening in an optical axis direction of the lens module is shorter than a length of the opening in a direction perpendicular to the optical axis direction.

12. The camera module of claim 9,
wherein the opening comprises:
a first inner side surface and a second inner side surface disposed opposite each other with respect to a center of the opening; and
a third inner side surface and a fourth side surface disposed opposite each other with respect to the center of the opening, and respectively connecting the first and second inner side surfaces to each other, and
wherein a shortest distance between the first inner side surface and the second inner side surface is longer than a shortest distance between the third inner side surface and the fourth inner side surface.

13. The camera module of claim 9, wherein a length of at least one lens, among the lenses, in a first direction perpendicular to an optical axis is shorter than a length of the at least one lens in a second direction perpendicular to the optical axis and the first direction,
wherein the at least one lens is disposed such that a side surface of the at least one lens facing the first direction faces a bottom surface of the housing, and
a portion of the bottom surface of the housing disposed between the lens module and the image sensor module includes a groove portion.

14. The camera module of claim 13, wherein the groove portion comprises an inclined surface.

15. The camera module of claim 13, wherein protrusions are disposed in the groove portion, and
wherein each of the protrusions comprises a convex curved surface.

16. A reflection module, comprising:
a holder; and
a reflective member mounted on the holder and including an incident surface, a reflective surface, an emitting surface, a first side surface disposed on one side of the reflective member, and a second side surface disposed on the other side of the reflective member,
wherein the holder includes a cover portion covering a bottom edge of the emitting surface at which the emitting surface is connected to the reflective surface, and
wherein the cover portion comprises protrusions configured to scatter light.

17. The reflection module of claim 16, wherein the protrusions have a triangular columnar shape.

18. The reflection module of claim 16, wherein the cover portion is connected to additional cover portions respectively covering opposing side edges of the emitting surface.

19. The reflective module of claim 18, wherein an area of each of the additional cover portions increases in a direction toward the bottom edge of the emitting surface.

* * * * *